(12) United States Patent
Tsuruya et al.

(10) Patent No.: US 7,256,157 B2
(45) Date of Patent: Aug. 14, 2007

(54) CARBON MATERIAL FOR ELECTRIC DOUBLE LAYER CAPACITOR ELECTRODES

(75) Inventors: Hirotaka Tsuruya, Ibaraki (JP); Koichi Kanno, Ibaraki (JP); Hitoshi Sakamoto, Ibaraki (JP); Yuzuru Takahashi, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 533 days.

(21) Appl. No.: 10/703,635

(22) Filed: Nov. 10, 2003

(65) Prior Publication Data

US 2004/0092394 A1 May 13, 2004

Related U.S. Application Data

(62) Division of application No. 09/949,604, filed on Sep. 12, 2001, now abandoned.

(30) Foreign Application Priority Data

Sep. 13, 2000 (JP) .............................. 2000/278051

(51) Int. Cl.
*C01B 31/12* (2006.01)
(52) U.S. Cl. ...................................... 502/423; 502/427
(58) Field of Classification Search ......... 502/416–439
See application file for complete search history.

(56) References Cited

U.S. PATENT DOCUMENTS 4,460,708 A * 7/1984 Stuetz ........................ 502/426
5,182,010 A * 1/1993 Mochida et al. .............. 208/44
5,416,056 A * 5/1995 Baker ......................... 502/425
5,891,822 A * 4/1999 Oyama et al. .............. 502/427
6,118,650 A   9/2000 Maeda et al.

FOREIGN PATENT DOCUMENTS

| EP | 0 890 963 | 1/1999 |
| EP | 0 927 778 | 7/1999 |
| JP | 03 223391 | 10/1991 |
| JP | 10 308221 | 11/1998 |
| JP | 2000 138140 | 5/2000 |

* cited by examiner

*Primary Examiner*—Stuart L Hendrickson
*Assistant Examiner*—Daniel C. McCracken
(74) *Attorney, Agent, or Firm*—Antonelli, Terry, Stout & Kraus, LLP.

(57) ABSTRACT

A carbon material for electric double layer capacitor electrodes which is obtained by a heat treatment and an activation treatment of a material pitch having a softening point in a range of 150 to 350° C., a ratio of amounts by atom of hydrogen to carbon (H/C) in a range of 0.50 to 0.90 and a content of optically anisotropic components of 50% or greater. The material pitch is preferably a synthetic pitch obtained by polymerizing a condensed polycyclic hydrocarbon such as naphthalene, methylnaphthalene, anthracene, phenanthrene, acenaphthene, acenaphthylene and pyrene in the presence of an ultra-strong acid catalyst such as a hydrogen fluoride-boron trifluoride complex. Electric double layer capacitors having a high electrode density and a high electrostatic capacity per unit volume can be constructed using the carbon material.

6 Claims, No Drawings

CARBON MATERIAL FOR ELECTRIC DOUBLE LAYER CAPACITOR ELECTRODES

CROSS REFERENCE TO RELATED APPLICATION

This application is a divisional application of U.S. Ser. No. 09/949,604, filed Sep. 12, 2001 now abandoned, the contents of which are incorporated herein by reference.

BACKGROUND OF THE INVENTION

1. Field of the Invention

The present invention relates to a carbon material for electrodes which can be used for constructing electric double layer capacitors having a high electrode density and a high electrostatic capacity per unit volume.

2. Description of the Prior Art

An electric double layer capacitor (referred to as EDLC, hereinafter) is a condenser, i.e., a device for storing electricity, utilizing a double layer formed at the interface of a solid and a liquid. The structure comprises a pair of polarizing electrodes disposed on both sides of a separator, a case for containing the electrodes, an electrolytic liquid and a current collector.

As the material for the polarizing electrode, in general, active carbon having a large specific surface area is used. Examples of such active carbon include active carbons prepared from coconut shell, petroleum pitch and polyacrylonitrile. In Japanese Patent Application Laid-Open No. Heisei 9(1997)-320906, active carbons prepared from PVC and tar are described as organic materials which can be easily converted into graphite. In Japanese Patent Application Laid-Open No. Heisei 11 (1999)-293527, an electric double layer capacitor using carbon fiber derived from an optically isotropic pitch as the electrode material is described.

As for the electrolytic liquid, for example, an aqueous solution of sulfuric acid or an aqueous solution of potassium hydroxide is used as the aqueous electrolytic liquid and an electrolytic liquid of an organic solvent such as propylene carbonate in which an electrolyte such as lithium perchlorate or a quaternary ammonium salt is dissolved is used as the non-aqueous electrolytic liquid.

In preparation of the active carbon, in general, an activation process with a gas such as water vapor or carbon dioxide is conducted. To obtain an active carbon having a large specific surface area, it is necessary that the degree of activation be increased. However, the above process has a problem in that, since fine pores are formed by the reaction between the carbon material and water vapor or carbon dioxide which consumes carbon, an increase in the degree of activation results in a decrease in the yield and a decrease in the bulk density. The density of the electrode material cannot be increased, either.

The activation can also be achieved by using an alkali metal (referred to as the alkali activation, hereinafter). An active carbon having a large specific surface area and a high bulk density can be obtained at a high yield in accordance with the alkali activation since the activation proceeds in accordance with a mechanism in which carbon is not much consumed.

Since the electrostatic capacity per unit volume of EDLC can be improved by increasing the bulk density of the electrode material, it is considered that the alkali activation is the process suited for production of a carbon material for EDLC electrodes. However, the fine structure and the distribution of pores in the obtained active carbon are markedly different depending on the starting material and the condition of the heat treatment and the properties of EDLC are affected by these factors to a great degree. Therefore, it is very important that the starting material and the condition of the heat treatment are suitably selected.

SUMMARY OF THE INVENTION

The present invention has an object of overcoming the above problems of the conventional technology and providing a carbon material for EDLC electrodes which can be used for constructing EDLC having a high electrode density and a high electrostatic capacity per unit volume.

As the result of studies by the present inventors on the starting material, the process of treatments and the condition of treatments in detail, it was found that a carbon material for EDLC electrodes which can be used for constructing a high performance EDLC can be obtained by using a specific mesophase pitch as the starting material and treating the pitch by a heat treatment and an activation treatment. The present invention has been completed based on the knowledge.

The present invention provides a carbon material for electric double layer capacitor electrodes which is obtained by a heat treatment and an activation treatment of a material pitch having a softening point in a range of 150 to 350° C., a ratio of amounts by atom of hydrogen to carbon (H/C) in a range of 0.50 to 0.90 and a content of optically anisotropic components of 50% or greater, wherein the material pitch is preferably a synthetic pitch obtained by polymerizing a condensed polycyclic hydrocarbon such as naphthalene, methylnaphthalene, anthracene, phenanthrene, acenaphthene, acenaphthylene and pyrene in the presence of an ultra-strong acid catalyst such as a hydrogen fluoride-boron trifluoride complex.

DETAIL DESCRIPTION OF THE INVENTION

The material pitch used in the present invention is a pitch having a softening point in the range of 150 to 350° C., H/C in the range of 0.50 to 0.90 and a content of optically anisotropic components of 50% or greater. In particular, it is preferable that the material pitch is a synthetic pitch obtained by polymerizing a condensed polycyclic hydrocarbon such as naphthalene, methylnaphthalene, anthracene, phenanthrene, acenaphthene, acenaphthylene and pyrene in the presence of an ultra-strong acid catalyst such as a hydrogen fluoride-boron trifluoride complex.

In the present invention, the carbon material can be obtained by the heat treatment and the activation treatment of the material pitch described above. The heat treatment is conducted by raising the temperature from the room temperature to a temperature in the range of 400 to 800° C. in a heating oven under an atmosphere of an inert gas. As the inert gas, nitrogen or argon is used. When the final temperature for the heating is lower than 400° C., the polymerization reaction of the pitch is slow and the productivity is poor. When the final temperature exceeds 800° C., the material of the apparatus is limited and the cost of production increases. Thus, temperatures outside the above range are not preferable.

It is preferable that an infusibilizing treatment is conducted before the heat treatment since fusion and foaming of the pitch take place during the heat treatment without any treatments in advance. For the infusibilizing treatment, the material pitch is held in a heating oven of the type of circulation of heated air at a temperature of the softening point or lower for 30 minutes to 24 hours. The fusion and the foaming can be prevented by this treatment.

It is preferable that the granulation heat treatment method described in the following is used for the heat treatment. In a reactor kept at a temperature in the range of 400 to 800° C. under the atmosphere of an inert gas, a granular or powdery pitch obtained by a heat treatment in advance (referred to as a heat treated granular pitch, hereinafter) is placed and stirred. The material pitch is added to the pitch placed in the reactor and a heat treated pitch in a granular or powdery form can be prepared.

In accordance with the granulation heat treatment method, the added material pitch becomes liquid of a low viscosity by heating and is dispersed on the surface of the heat treated granular pitch placed in the reactor in advance. The polymerization proceeds thereafter by the heat and the material pitch is finally converted into a heat treated material which does not fuse. Since the heat treated granular pitch is always kept in the fluid condition by the stirring, gases formed by the reaction of the material pitch are quickly discharged to the outside of the system. Therefore, the heat treatment can be achieved efficiently in a reactor having a much smaller capacity than that used in the static process without formation of foams unlike the static process in which the heat treatment is conducted while the material pitch is left standing. The polymerization proceeds while the material pitch is dispersed on the surface of the heat treated granular pitch and the material pitch solidifies under the shearing force formed by the fluid movement of the heat treated granular pitch. Therefore, the product obtained after the heat treatment has an optical structure of a mosaic texture.

As the reactor used in the above process, a reactor of the tank type equipped with a stirring apparatus which can sufficiently stir the heat treated granular pitch, a reactor of the cylinder type equipped with a paddle for stirring or a rotary kiln can be used. When the reactor of the tank type is used, for example, a reactor equipped with a stirrer having an inclined rotational axis of the stirrer blades described in Japanese Patent Application Laid-Open No. Heisei 7(1995)-286181 can be used.

It is inevitable that, in the early period of the operation, a heat treat product having the structure of a flow texture produced in accordance with the static process is used as the heat treated granular pitch placed in the reactor in advance. The heat treated product having the structure of a flow texture is almost completely replaced with the newly formed heat treated product having the structure of a mosaic texture as the reaction is continued. Therefore, the heat treated product having the structure of a flow texture used in the early period of the operation little affects the active carbon obtained by the process.

The pitch which has been subjected to the heat treatment in the above is then subjected to the activation treatment. The chemical activation using an activating agent is preferable as the activation process. As the activating agent used for the activation, zinc chloride or an alkali metal compound is used. The alkali metal compounds are preferable and potassium hydroxide, potassium carbonate and potassium chloride are more preferable. Potassium hydroxide is most preferable.

When the temperature of the heat treatment is lower than 600° C., the carbonation can be completed and more efficient activation can be achieved by treating the heat treated pitch by a further heat treatment at 600° C. or higher before being mixed with the activating agent. A more efficient activation can be achieved by pulverization of the heat treated pitch before mixing with the activating agent since the surface area for contact with the activating agent is increased. As the pulverizing machine, a suitable machine can be selected from the pulverizer of the impact type, the jet mill and the like machines.

The activation treatment of the pitch which has been subjected to the heat treatment is conducted by pulverizing the product of the heat treatment into powder having diameters of 5 to 90 $\mu$m in accordance with the above process by a pulverizer of the impact type or the like, mixing the pulverized product with the activating agent and treating the obtained mixture by a further heat treatment.

When an alkali metal compound is used as the activating agent, the alkali metal compound in an amount in the range of 1 to 4 parts by weight per 1 part by weight of the heat treated powdery pitch is uniformly mixed with the heat treated powdery pitch and packed into a reactor. For forming an electric double layer, meso pores having diameters of 20 to 500 Å are suited. When the ratio of the amounts by weight of the alkali metal compound to the heat treated powdery pitch is smaller than 1, pores are not formed sufficiently. When the ratio of the amounts by weight of the alkali metal compound to the heat treated powdery pitch exceeds 4, micro pores which cannot form the electric double layer and macro pores formed by expansion of the meso pores are formed in increased amounts and a problem arises in that the bulk density decreases. It is more preferable that the alkali metal compound is mixed with the heat treated powdery pitch in an amount in the range of 1 to 3 parts by weight per 1 part by weight of the heat treated powdery pitch.

Then, the reactor is placed under the atmosphere of an inert gas such as nitrogen. The temperature of the reactor placed in a heating oven is raised from the room temperature to a temperature in the range of 400 to 900° C. and kept at this temperature for 1 to 20 hours. When the reaction temperature is lower than 400° C., the reaction does not proceed sufficiently and a sufficient degree of activation is not achieved. When the reaction temperature exceeds 900° C., a problem arises in that the alkali metal component such as the metallic potassium is separated and scattered and the reaction apparatus is corroded. It is more preferable that the activation treatment is conducted at a temperature in the range of 600 to 800° C.

Then, the reaction mixture is cooled to the room temperature, placed into an alcohol such as 2-propanol to remove the alkali metal component, filtered, repeatedly washed with water until the filtrate becomes neutral and dried. The active carbon which is used as the carbon material for electric double layer capacitor electrodes of the present invention can thus be obtained.

As the properties required for EDLC, in particular, the electrostatic capacity per unit volume is important. Adsorption of the electric double layer, i.e., adsorption of the electrolytic liquid to the inner surface of the pores of the active carbon, is related to the electrostatic capacity and pores suited for diffusion and adsorption of the substance to be adsorbed are necessary. Therefore, the electrostatic capacity per unit volume can be improved by using the active carbon having a greater fraction of such pores.

In the active carbon obtained in accordance with the process of the present invention, pores suited for the electric double layer are efficiently formed and the above requirements for the properties are sufficiently satisfied. Specifically, an anisotropic carbon having a high real density is obtained by the heat treatment of the material pitch described in the present invention. An active carbon in which many suitable pores are formed can be efficiently produced by further activating the above carbon. EDLC in which the above active carbon is used for the electrode material exhibits an electrostatic capacity per unit weight which is the same as or greater than that of active carbons obtained in accordance with conventional processes. Since the bulk density of the obtained active carbon is high, an excellent electrode material having an electrostatic capacity per unit volume much greater than that of materials obtained in accordance with conventional processes, i.e., 30 F/cc or greater, can be obtained.

As will be shown in examples in the following, in accordance with the present invention, a carbon material for EDLC electrodes which can be used for constructing EDLC having a high electrode density and a high electrostatic capacity per unit volume can be obtained by the heat treatment and the activation treatment of a pitch having a softening point in the range of 150 to 350° C., a ratio of amounts by atom of hydrogen to carbon (H/C) in the range of 0.50 to 0.90 and a content of optically anisotropic components of 50% or greater, in particular, a synthetic pitch obtained by polymerizing a condensed polycyclic hydrocarbon such as naphthalene, methylnaphthalene, anthracene, phenanthrene, acenaphthene, acenaphthylene and pyrene in the presence of an ultra-strong acid catalyst such as a hydrogen fluoride-boron trifluoride complex.

EXAMPLES

The present invention will be described more specifically with reference to examples in the following. However, the present invention is not limited to the examples.

Example 1

A mesophase pitch (the softening point: 235° C.; H/C=0.65; the content of optically anisotropic components: 100%; the yield of carbonation: 87%) was synthesized by polymerization of naphthalene in the presence of the hydrogen fluoride-boron fluoride complex. For the heat treatment of the pitch, the temperature was raised to 530° C. at a rate of 5° C./minute under the atmosphere of nitrogen and kept at 530° C. for 1 hour. Then, after the temperature was lowered to the room temperature, the product was pulverized and a heat treated mesophase pitch having an average particle diameter of about 0.5 mm was obtained.

The obtained pitch was pulverized by a pulverizer of the impact type and a powder having an average diameter of 15 µm was obtained. The obtained powder was heated in a tubular oven under the atmosphere of nitrogen while the temperature was raised to 700° C. at a rate of 5° C./minute and kept at 700° C. for 4 hours. After the temperature was lowered to the room temperature, potassium hydroxide in an amount of 2 parts by weight per 1 part by weight of the heat treated powder was added to the heat treated powder and uniformly mixed together. The resultant mixture was heated under the atmosphere of nitrogen while the temperature was raised to 700° C. at a rate of 5° C./minute and kept at 700° C. for 2 hours. After the temperature was lowered to the room temperature, the product was placed in 2-propanol. Filtration and washing with water were repeated until the filtrate became neutral and an active carbon was obtained.

Electrodes were prepared using the obtained active carbon in accordance with the following process and evaluated.

Electrodes were prepared by mixing the active carbon, an electrically conductive filler (ketjen black) and a binder (Teflon) in amounts such that the ratio of the amounts by weight of the active carbon, the filler and the binder was 90:10:5. A cell of the two electrode type made of glass was used. A separator made of glass fiber is placed between a pair of the electrodes and placed into the cell. As the electrolytic liquid, propylene carbonate in which tetraethylammonium tetrafluoroborate (($C_2H_5$)$_4$$NBF_4$) was dissolved in a concentration of 0.65 mole/liter was used.

Under the atmosphere of argon and at the room temperature, the cell was charged with a constant current of 5 mA/g until the voltage finally reached 3 volts. The charged cell was then discharged with a constant current of 5 mA/g until the voltage became zero volt. The electrostatic capacity per unit volume was calculated by multiplying the electrostatic capacity per unit weight C by the density of the electrode. The electrostatic capacity per unit weight C is expressed as $C = I \Delta T / \Delta V$, wherein I represents the average value of the current per unit weight of the electrode during the discharge, $\Delta T$ represents the time of lowering the voltage and $\Delta T$ represents the lowered range of the voltage. As the result, the electrostatic capacity was found to be as excellent as 32.4 F/cc.

Example 2

A mesophase pitch was synthesized in accordance with the same procedures as those conducted in Example 1.

For the heat treatment of the pitch, the temperature was raised to 530° C. at a rate of 5° C./minute under the atmosphere of nitrogen and kept at 530° C. for 1 hour. Then, after the temperature was lowered to the room temperature, the product was pulverized and a heat treated mesophase pitch having an average particle diameter of about 0.5 mm was obtained.

Into a reactor of the tank type having a diameter of 170 mm and a height of 170 mm and equipped with a stirrer, 200 g of the mesophase pitch obtained above was placed in advance as the heat treated granular pitch. The temperature was raised to 550° C. under stirring under the stream of nitrogen and the mesophase pitch obtained above was added to the reactor at a rate of 10 g per minute until the total amount reached 300 g.

After the addition was completed and the temperature was kept at 550° C. for further 10 minutes, the reactor was cooled and the content of the reactor was taken out. A granular heat treated product was obtained in an amount of 400 g. The obtained heat treated product was used as the heat treated granular pitch and the same heat treatment as that described above was conducted. This treatment was repeated 7 times and a heat treated mesophase pitch in which about 99% of the amount had been replaced with the desired heat treated granular pitch was obtained. The obtained pitch was pulverized by a pulverizer of the impact type and powder having an average diameter of 15 µm was obtained. The obtained powder was heated in a tubular oven under the atmosphere of nitrogen while the temperature was raised to 700° C. at a rate of 5° C./minute and kept at 700° C. for 4 hours.

The activation treatment and the evaluation of the electrodes were conducted in accordance with the same procedures as those conducted in Example 1. The electrostatic capacity was obtained in accordance with the same procedures as those conducted in Example 1 and found to be 44.3 F/cc.

Example 3

A mesophase pitch was synthesized in accordance with the same procedures as those conducted in Example 1 and pulverized by a pulverizer into a powder having an average diameter of 20 μm. The obtained powder of mesophase pitch was subjected to the infusibilizing treatment and the heat treatment.

For the infusibilizing treatment, a heating oven of the type of circulation of dry air was used. Into a vat made of stainless steel, 20 g of the powder of mesophase pitch was placed in a manner such that the entire bottom face of the vat was covered with the mesophase pitch. The vat was then kept in a reaction oven at a temperature of 200° C. for 10 hours. The obtained product which had been subjected to the infusibilizing treatment was subjected to the activation treatment in accordance with the same procedures as those conducted in Example 1 and the obtained electrode was evaluated. The electrostatic capacity was obtained in accordance with the same procedures as those conducted in Example 1 and found to be 30.2 F/cc.

Comparative Example 1

A powder of carbon of coconut shell was subjected to the activation treatment while the temperature was raised to 900° C. at a rate of 5° C./minute under the atmosphere of nitrogen and kept at 900° C. for 3 hours under a stream of nitrogen containing 10% of water vapor. Using the obtained product as the electrode material, the electrostatic capacity was obtained in accordance with the same procedures as those conducted in Example 1 and found to be 16.4 F/cc.

Comparative Example 2

A powder of carbon of coconut shell and potassium hydroxide in an amount of 2 parts by weight per 1 part by weight of the carbon were uniformly mixed together. The resultant mixture was subjected to the activation treatment while the temperature was raised to 700° C. at a rate of 5° C./minute under the atmosphere of nitrogen and kept at 700° C. for 2 hours. Using the obtained product as the electrode material, the electrostatic capacity was obtained in accordance with the same procedures as those conducted in Example 1 and found to be 12.4 F/cc.

Comparative Example 3

Ethylene tar and furfural each in an amount of 1 part by weight were mixed together and 5% of p-toluenesulfonic acid was added to the resultant mixture. A powder of carbon obtained by the reaction of the mixture at 150° C. was subjected to the activation treatment while the temperature was raised to 900° C. at a rate of 5° C./minute under the atmosphere of nitrogen and then kept at 900° C. for 3 hours under a stream of nitrogen containing 10% of water vapor. Using the obtained product as the electrode material, the electrostatic capacity was obtained in accordance with the same procedures as those conducted in Example 1 and found to be 18.5 F/cc.

Comparative Example 4

Ethylene tar and furfural each in an amount of 1 part by weight were mixed together and 5% of p-toluenesulfonic acid was added to the resultant mixture. A powder of carbon obtained by the reaction of the above mixture at 150° C. and potassium hydroxide in an amount of 2 parts by weight per 1 part by weight of the carbon were uniformly mixed together. The resultant mixture was subjected to the activation treatment while the temperature was raised to 700° C. at a rate of 5° C./minute under the atmosphere of nitrogen and then kept at 700° C. for 2 hours. Using the obtained product as the electrode material, the electrostatic capacity was obtained in accordance with the same procedures as those conducted in Example 1 and found to be 5.5 F/cc.

Comparative Example 5

A coal tar pitch having a softening point of 76° C. and H/C of 0.55 was placed into an autoclave. The air in an amount of 2 liters per 100 g of the tar was blown into the autoclave at 340° C. The reaction was allowed to proceed for 1 hour and a 100% optically isotropic modified pitch having a softening point of 243° C. was obtained. H/C in the modified pitch was 0.48.

The modified pitch was pulverized and a powder having diameters of 200 μm or smaller was obtained. The powder in an amount of 10 g was placed in a porcelain dish and the dish was placed in a muffle oven. The temperature was raised from 150° C. to 320° C. at a rate of 0.5° C./minute under a stream of air of 1 liter per minute and kept at 320° C. for 10 minutes and then the product was taken out. In accordance with the same procedures as those conducted in Example 3, the obtained product which had been subjected to the infusibilizing treatment was placed into a tubular oven and heated while the temperature was raised to 700° C. at a rate of 5° C./minute and kept at 700° C. for 4 hours. The obtained powder which had been subjected to the heat treatment and the infusibilizing treatment was subjected to the activation treatment in accordance with the same procedures as those conducted in Example 1 and the obtained electrode was evaluated. The electrostatic capacity was obtained in accordance with the same procedures as those conducted in Example 1 and found to be 19.5 F/cc.

The results of Examples 1 to 3 and Comparative Examples 1 to 5 are summarized in Table 1.

TABLE 1

| | Starting material | Method of activation | Electrostatic capacity per unit volume (F/cc) |
|---|---|---|---|
| Example 1 | mesophase pitch | KOH | 32.4 |
| Example 2 | mesophase pitch | KOH | 44.3 |
| Example 3 | mesophase pitch | KOH | 30.2 |
| Comparative Example 1 | coconut shell | water vapor | 16.4 |
| Comparative Example 2 | coconut shell | KOH | 12.4 |
| Comparative Example 3 | ethylene tar pitch | water vapor | 18.5 |
| Comparative Example 4 | ethylene tar pitch | KOH | 5.5 |
| Comparative Example 5 | isotropic pitch | KOH | 19.5 |

What is claimed is:

1. A process for producing a carbon material for electric double layer capacitor electrodes, which comprises the steps of:
   (a) heating a material pitch having a softening point of 150 to 350° C., a hydrogen/carbon ratio of 0.50 to 0.90 by atom and a content of optically anisotropic components of 50% or greater, at 400 to 800° C. under an inert gas atmosphere to produce a heat-treated granular or powdery pitch, the material pitch being a synthetic pitch produced by polymerizing a condensed polycyclic hydrocarbon or a substance containing the condensed polycyclic hydrocarbon in the presence of a hydrogen fluoride-boron trifluoride complex;

(b) placing the heat-treated granular or powdery pitch obtained in step (a) into a reactor;

(c) adding additional material pitch to the heat-treated granular or powdery pitch placed in the reactor while stirring and heating at 400 to 800° C. so as to allow the material pitch to be dispersed on the surface of the heat-treated granular or powdery pitch, thereby performing heat treatment at 400 to 800° C. while keeping the heat-treated granular or powdery pitch in fluid state by stirring to obtain a heat-treated pitch;

(d) activating the heat-treated pitch from step (c) by mixing the heat-treated pitch with an alkali metal compound in an amount of 1 to 4 parts by weight per one part by weight of the heat-treated pitch while heating at 400 to 900° C. in an inert gas stream.

2. The process according to claim 1, wherein the condensed polycyclic hydrocarbon or the substance containing the condensed polycyclic hydrocarbon is selected from the group consisting of naphthalene, methylnaphthalene, anthracene, phenanthrene, acenaphthene, acenaphthylene and pyrene.

3. The process according to claim 1, wherein the amount of the alkali metal compound mixed in step (d) is 1 to 3 parts by weight per one part by weight of the heat-treated pitch.

4. The process according to claim 1, wherein the activation in step (d) is performed at 600 to 800° C.

5. The process according to claim 1, wherein the heat treatment of step (c) is performed at a temperature lower than 600° C. and then at 6000C or higher.

6. The process according to claim 1, wherein the heat-treated pitch from step (c) has an average particle size of 5 to 90 μm.

* * * * *